(12) United States Patent
Warner et al.

(10) Patent No.: US 6,950,778 B2
(45) Date of Patent: Sep. 27, 2005

(54) PROGRAMMABLE PHOTOELECTRIC SENSOR AND A SYSTEM FOR ADJUSTING THE PERFORMANCE CHARACTERISTICS OF THE SENSOR

(75) Inventors: Robert Warner, New Port Richey, FL (US); Scott Seehawer, Lutz, FL (US); Daniel Hacquebord, Tampa, FL (US)

(73) Assignee: Tri-Tronics Company, Inc., Tampa, FL (US)

( * ) Notice: Subject to any disclaimer, the term of this patent is extended or adjusted under 35 U.S.C. 154(b) by 0 days.

(21) Appl. No.: 10/174,488

(22) Filed: Jun. 19, 2002

(65) Prior Publication Data

US 2003/0014217 A1 Jan. 16, 2003

Related U.S. Application Data

(60) Provisional application No. 60/299,441, filed on Jun. 21, 2001.

(51) Int. Cl.[7] .............................................. G06F 17/00
(52) U.S. Cl. ........................ 702/182; 702/188; 702/183; 250/221
(58) Field of Search .......................... 702/182, 96, 104, 702/100, 122, 123, 172, 183, 187, 188, 189, 176–178, FOR 103, FOR 105, FOR 131, FOR 136, FOR 134, FOR 135, FOR 154, FOR 156, FOR 163, FOR 170, FOR 171; 250/221, 222.1, 223 R, 223 B, 214 B, 214 R, 214 G, 559.38, 559.39, 214 AG, 214 DC, 205, 559.4, 222, 200, 559.1, 559.32; 345/700, 734–736, 810, 35, 961, 965–967, 969, 970, 39; 340/555–557, 600, 619, 815.4, 815.45, 815.55; 356/218, 221, 222, 227, 228; 700/83, 86, 87

(56) References Cited

U.S. PATENT DOCUMENTS

| 5,281,810 | A | * | 1/1994 | Fooks et al. ............. 250/222.1 |
| 5,621,205 | A | * | 4/1997 | Warner et al. ............. 250/205 |
| 5,808,296 | A | * | 9/1998 | McMonagle et al. ....... 250/221 |
| 5,825,361 | A | * | 10/1998 | Rubin et al. ............... 345/839 |
| 6,002,996 | A | * | 12/1999 | Burks et al. ............... 702/188 |
| 6,275,225 | B1 | * | 8/2001 | Rangarajan et al. ........ 345/700 |
| 6,553,336 | B1 | * | 4/2003 | Johnson et al. ............ 702/188 |
| 6,555,806 | B2 | * | 4/2003 | Okamoto .................... 250/221 |
| 2001/0000964 | A1 | * | 5/2001 | Alexander .................. 345/440 |

OTHER PUBLICATIONS

Horwitz et al., "Microprocessor–based spectral responsivity calibration system for photosensors", 1979, SPIE vol. 196 Measurements of Optical Radiations, pp. 63–73.*

* cited by examiner

*Primary Examiner*—Hal Wachsman
(74) *Attorney, Agent, or Firm*—McDermott Will & Emery LLP

(57) ABSTRACT

A programmable photoelectric sensor and a system for programming/controlling the photoelectric sensor and for monitoring the performance of the photoelectric sensor. The system includes a processor coupled to the photoelectric sensor, which is operative for generating at least one graphical user interface and for programming/adjusting the operation of the photoelectric sensor; and a display device coupled to the processor for displaying the graphical user interface. The processor programs/adjusts the operation of the photoelectric sensor in accordance with selections of an operator utilizing icons displayed on the graphical user interface.

73 Claims, 11 Drawing Sheets

PROGRAMMABLE PHOTOELECTRIC SENSOR AND A SYSTEM FOR ADJUSTING THE PERFORMANCE CHARACTERISTICS OF THE SENSOR

RELATED APPLICATIONS

This application claims priority from U.S. Provisional Patent Application No. 60/299,441, filed Jun. 21, 2001, the disclosure of which is incorporated herein, in its entirety, by reference.

FIELD OF THE INVENTION

The present invention relates to a programmable, digitally controlled photoelectric sensor, and a system which allows an operator to easily adjust the sensor to a specific sensing task by viewing a simple, easy-to-use graphic display monitor and selecting (e.g., by clicking utilizing a computer mouse) icons representing the desired mode of operation. Upon selection of the desired mode of operation, the system automatically recalls the proper performance attributes/parameters (e.g., response time, hysteresis, autoset level, output mode, etc.) and programs/controls the sensor to operate in accordance with the recalled performance parameters. Once the set-up procedure is completed, the system allows the operator to monitor the response of the sensor on either a LED contrast indicator built into the sensor, or on a graphic display oscilloscope-style contrast deviation analyzer. Moreover, while viewing the contrast deviation analyzer of the display monitor, the operator can vary (i.e., "tweak") the sensor settings so as to obtain the optimal sensor settings for the given sensing task. Once such "tweaking" is completed, and the operator has visually verified a proper response of the sensor to the given sensing task, the sensor settings including the configured performance parameters can be stored for later recall.

DESCRIPTION OF THE PRIOR ART

The use of photoelectric sensors for detecting the presence or absence of objects is well known in various industries. For example, in one of the most simple detection scenarios, photoelectric sensors may be utilized to detect the presence (i.e., count) of objects (e.g., boxes) on a conveyor belt. In such instances, typically, the determination of the proper sensor settings to accurately and consistently count the boxes can readily be performed.

However, there are many sensing environments and sensing tasks in which the determination of the proper sensor settings necessary to accurately and consistently identify the presence (or absence) of an object can not be easily performed. For example, in certain low contrast detection scenarios, or in detection scenarios in which the object is subject to substantial vibration, it is often difficult to determine the sensor settings necessary for the sensor to repeatedly and accurately record each output event (e.g., detection of an object). In other words, it is difficult to determine the optimal sensor settings for the given sensing environment. This task of optimizing the sensor settings is further complicated by the increase in the number of features and parameters of today's photoelectric sensors, which are controllable/variable by the operator.

The optimization task is compounded by the fact that known photoelectric sensors did not provide much guidance to the operator with regard to the actual operation of the photoelectric sensor while performing a given sensing task. Early photoelectric sensors contained an LED which would be illuminated upon occurrence of an output event (e.g., the received signal level passing a dark-to-light trip point). However, no other information was provided to the operator. The operator had no knowledge of, for example, how far the signal level exceeded the trip point, whether or not a random/erroneous event caused the signal level to pass the trip point. As a result, if the sensing operation was not performing as expected, the operator had no choice but to begin adjusting the sensor (e.g., adjust amplifier gain, adjust LED signal level, etc.) until proper operation was obtained. However, such adjustments were essentially based solely on the operator's knowledge and past experience. If an operator was new, the adjustment process could require a significant trial and error process, and require a substantial amount of time.

U.S. Pat. No. 4,644,341, the disclosure of which is hereby incorporated by reference, made an initial step in attempting to provide the operator with additional useful information regarding the operation of the photoelectric sensor. Specifically, the photoelectric sensor disclosed in the '341 patent included a contrast indicator embodied in the form of an LED array included in the photoelectric sensor. As explained in the '341 patent, the contrast indicator displays scaled readings of the sensor's response to contrasting light levels (i.e., light vs. dark), thereby allowing the operator to observe the contrast differential during actual operation of the sensor. Such information is useful to the operator when attempting to adjust the sensor for proper operation.

Notwithstanding the ability of the photoelectric sensor of the '341 patent to provide contrast information during operation, the sensor lacks the ability to provide the operator with additional information that would expedite the adjustment process and allow for further optimization of the sensor settings. For example, the sensor of the '341 patent does not provide any indication regarding whether or not the sensor is on the verge of operating in a saturation region (i.e., outside of the useful dynamic range of the sensor), which is something the operator attempting to adjust the sensor would need to be aware of.

Accordingly, there exists a need for providing a photoelectric sensor and system for controlling/programming the sensor which overcomes the foregoing problems.

SUMMARY OF THE PRESENT INVENTION

In an effort to solve the aforementioned deficiencies of the prior art sensor, it is an object of the present invention to provide a photoelectric sensor and system for controlling/programming the sensor which simplifies the set-up process so as to allow even novice operators to quickly perform the set-up procedure and configure the sensor for the given sensing task. It is a further object of the invention to provide a photoelectric sensor and a system for controlling/programming the sensor, which provides the operator with detailed information regarding the operation of the sensor on a substantially real-time basis so as to allow the operator to optimize the sensor settings.

More specifically, the present invention relates to a programmable photoelectric sensor and a system for programming/controlling the photoelectric sensor and for monitoring the performance of the photoelectric sensor. The system comprises a processor coupled to the photoelectric sensor, which is operative for generating at least one graphical user interface and for programming/adjusting the operation of the photoelectric sensor; and a display device coupled to the processor for displaying the graphical user interface. The processor programs/adjusts the operation of the photoelectric sensor in accordance with selections of an operator utilizing icons displayed on the graphical user interface.

The present invention also relates to a method for programming a photoelectric sensor and for monitoring the performance of said photoelectric sensor. The method includes the steps of generating at least one graphical user interface utilized for programming the operation of the photoelectric sensor; displaying the graphical user interface on a display device; and programming/controlling the operation of the photoelectric sensor in accordance with a selection of an operator utilizing the graphical user interface, wherein the graphical user interface depicts a plurality of modes of operation for the photoelectric sensor. A processor is utilized to program the photoelectric sensor to operate in a given one of the plurality of modes of operation upon selection of the given mode of operation via selection of an icon on the graphical user interface.

As described in further detail below, the present invention provides significant advantages over the prior art. Most importantly, the present invention allows even the novice operator to easily and quickly set-up the sensor to perform a given sensing task by viewing and selecting the desired sensing mode via icons displayed on a graphical user interface (GUI). Upon selection of the desired sensing mode, the system automatically configures the settings of the photoelectric sensor such that the sensor is operable in the desired sensing mode, and instructs the operator how to perform any necessary calibration routine for the given sensing task. Thus, an operator with essentially no experience regarding the requirements for operating a photoelectric sensor can perform the set-up operation in an efficient, simple manner.

Another advantage of the present invention is that it allows the operator to monitor the actual response of the sensor on a contrast indicator built into the photoelectric sensor in the form of an LED array, or by utilizing a graphic display oscilloscope style contrast deviation analyzer. The contrast deviation analyzer charts the signal level deviation of the received signal against the background of the dynamic range of the sensor while monitoring on-going input events. This allows the operator to view the actual response of the sensor on a substantially real time basis, and adjust the performance parameters of the sensor to optimize sensor performance to the specific sensing task.

Yet another advantage of the photosensor of the present invention is that once the performance parameters are determined for a particular sensing task, these performance parameters can be stored in memory in the photosensor. As a result, if the sensor is utilized for multiple sensing tasks, the optimal performance parameters can be recalled from memory and utilized to control/program the sensor to restore the recalled performance parameters, thereby eliminating the need for the operator to re-perform the set-up process. It is noted that in one embodiment the sensor can only store one setting, and the computer is utilized to store any other previous settings. However, these previously stored settings can be downloaded to the sensor at any time.

Additional advantages of the present invention will become apparent to those skilled in the art from the following detailed description of exemplary embodiments of the present invention.

The invention itself, together with further objects and advantages, can be better understood by reference to the following detailed description and the accompanying drawings.

BRIEF DESCRIPTION OF THE DRAWINGS

Preferred embodiments of the invention will now be described in greater detail with reference to the accompanying drawings, in which.

DETAILED DESCRIPTION OF THE INVENTION

Figure 1:
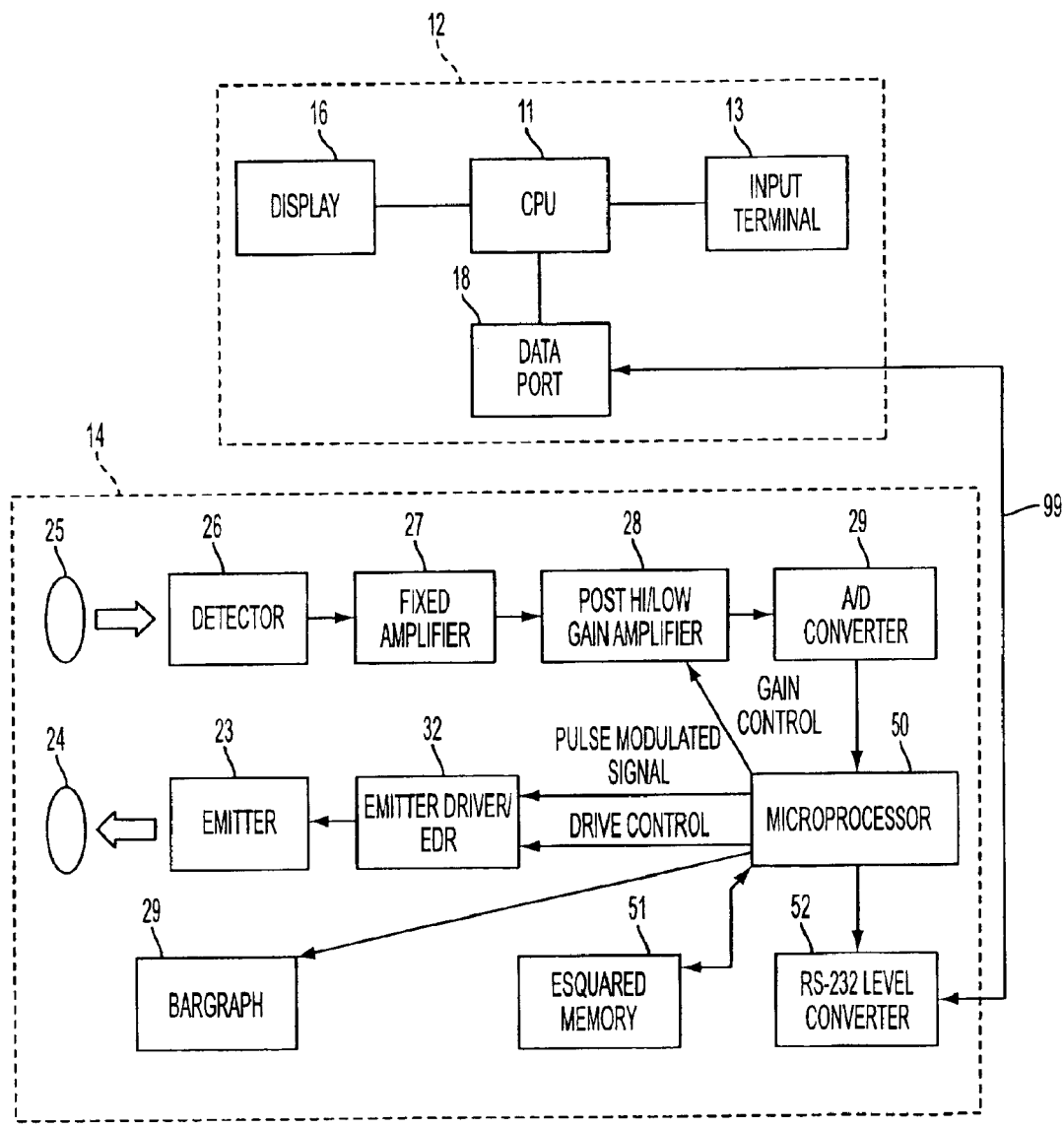
FIG. 1 illustrates an exemplary block diagram of the system of the present invention including the photoelectric sensor.

FIG. 1 illustrates an exemplary block diagram of the system of the present invention which includes a computer device 12 and the digitally controlled photoelectric sensor 14. Referring to FIG. 1, the computer device 12 includes a microprocessor/CPU 11, an operator input terminal 13 (e.g., keyboard, mouse, etc.), a display monitor 16 and a data port 18 capable of forwarding instructions/commands to the sensor 14, and receiving data from the sensor 14. In the exemplary embodiment of FIG. 1, the computer device communicates with the sensor via a serial data bus 99 employing the RS-232 standard. However, it should be noted that the present invention is not limited as such, and any other suitable communication link can be utilized.

Referring to the sensor 14, the sensor 14 comprises a variable current driver circuit 32 and an emitter light source 23, which is typically a light emitting diode (LED). A pulse modulated signal from a microprocessor 50 contained in the sensor is coupled to the LED driver circuit 32 to pulse the light output of the LED. Pulse modulation is typically used in photoelectric sensors to eliminate the effects of ambient light during photosensor operation.

The pulse modulated light from the light source is emitted through the transmitting lens 24 or a fiber optic light guide, and directed at the target. The light reflected from the target impinges upon the receiving lens 25 or fiber optic light guide, which focuses or presents the reflected light on a light sensor 26, which is typically a photodiode or phototransistor. The signal output from the light sensor 26 is then amplified, for example, by the combination of a fixed amplifier 27 and a post HI/LOW gain amplifier 28, and then fed to a high-speed analog to digital converter 29. The microprocessor 50 samples the peak amplitude of the signal and processes the peak values to produce a digital value that represents the DC voltage commonly produced by analog peak detector demodulation. The microprocessor 50 is also coupled to and drives a LED bargraph display 59, which functions as a light state/dark state contrast indicator. As indicated above, a detailed description of a bargraph display is set forth in U.S. Pat. No. 4,644,341. It is noted that the bar graph display circuit is not necessary for operation of the system, but is part of the preferred embodiment.

The output of the microprocessor 50 is also coupled to an output interface circuit, which can comprise, for example, an open collector NPN and PNP output circuit and an output on indicator LED. The output interface circuit provides an indication that the demodulated light level has exceed a predetermined level (i.e., light state) or fallen beneath a predetermined level (i.e., dark state) depending on the mode of operation. In other words, the output interface circuit indicates to the operator when an "output event" has occurred.

The sensor further comprises an enhanced dynamic range control circuit 32 which includes a light intensity control circuit. The microprocessor 50, during the setup software routine, increases the intensity of the light source to a level that allows the sensor to provide optimum dynamic range for that particular setup. As a result, the enhanced dynamic range control circuit functions to prevent dark state saturation, and extends the overall dynamic range of the sensor. A detailed example of an enhanced dynamic range control circuit is set forth in U.S. Pat. No. 5,621,205, the disclosure of which is hereby incorporated by reference.

In the preferred embodiment, the enhanced dynamic range control circuit comprises a feedback loop which operates to regulate the current presented to the LED. This prevents drift due to variations in temperature and supply voltage. Accordingly, a stable drive current is provided, which is necessary so as to provide for the settings recall or memory feature of the sensor. Specifically, when recalling a previous setting it is necessary for the sensor to be accurately set back to the previous setting. The stable drive current provided by the enhanced dynamic range control circuit allows for this operation.

The sensor also comprises an automatic contrast tracking (ACT) software routine which is executed by microprocessor 50 and which functions to automatically adjust the sensor so as to maintain acceptable contrast between light and dark states as conditions change that detrimentally effect the performance of the sensor. Causes for deterioration of performance include, for example, a dirty lens and broken fiber optic strands. As explained in more detail below, the ACT software routine monitors the numerical value that represents the sensor's signal swing so as to insure that the current maximum light state level exceeds a preset minimum level. If not, the ACT circuit functions to adjust the sensor such that the current maximum light state level exceeds the preset minimum. For example, when operating in the proximity mode, as an object passes through the effective light beam, the demodulated signal, which is proportional to the intensity of the received light, reaches a peak value as the object comes into view. As the object passes, the signal level diminishes. As the signal level passes through the sensor's output switch point, the ACT software routine determines if the acceptable preset light state level has been exceeded. If the preset light state level has not been exceeded, the ACT circuit functions to adjust the sensor digital offset so that the preset light state level is exceeded. In addition, if the ACT software changes the digital offset to a value that approaches the extremes of the range of the digital offset, the sensor will provide a warning that lets the operator know that the sensor will no longer be able to adjust itself via the ACT.

In a similar manner, the ACT software also functions to monitor the minimum signal in the dark state when the object has passed through the light beam. If the minimum signal level achieved in the dark state fails to go below an acceptable level, the ACT software functions to adjust the sensor digital offset so that the dark state signal level goes below the preset acceptable level. The ACT software will also generate the warning signal under these circumstances.

To summarize, when the signal level passes through the sensor's switch point going toward the light state, the ACT functions to monitor whether an acceptable deviation from the dark state has occurred, and if necessary, adjusts the sensor operation to make the deviation acceptable. Similarly, when the signal level passes through the sensor's switch point going toward the dark state, the ACT functions to monitor whether an acceptable deviation from the light state has occurred, and if necessary, adjusts the sensor operation to make the deviation acceptable.

Referring again to FIG. 1, the sensor further comprises a non-volatile memory 51. The memory 51 is coupled to microprocessor 50 and functions in-part to store data (e.g., performance parameters) that characterizes the current setup of the sensor. The current setup can be download via the sensor's communication port 52 and stored in external memory for later recall and upload back to the sensor 14. As explained in more detail below, the microprocessor 50 is coupled to numerous of the aforementioned circuits contained in the sensor 14 and functions to control the operation of these circuits. It is noted that it is possible to program the microprocessor to perform some of the functions performed by the foregoing circuits, as well as replace the microprocessor 50 with a dedicated ASIC chip in some circumstances.

The overall operation of the system of the present invention will now be discussed in greater detail. One of the main advantages of the present system is the ease with which the operator can set the sensor to the desired mode of operation, and thereafter adjust the sensor so as to optimize the performance of the sensor for the particular sensing application.

Figure 2A:
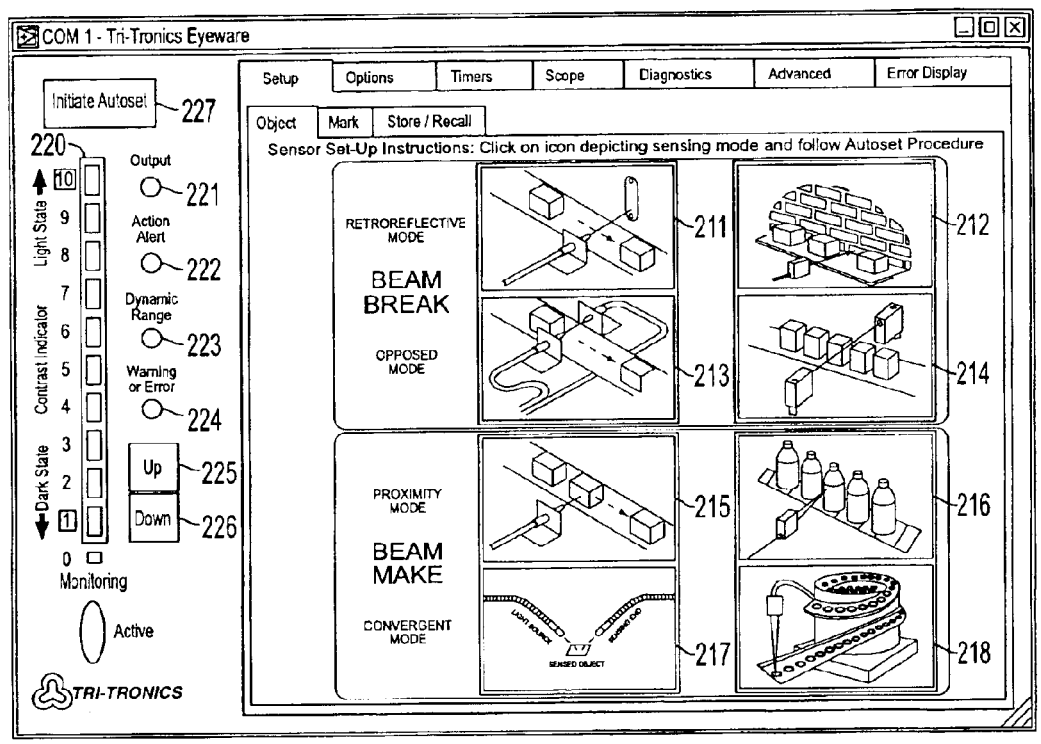
FIGS. 2a and 2b illustrates screen shots of exemplary GUI set-up screens.
Figure 2B:
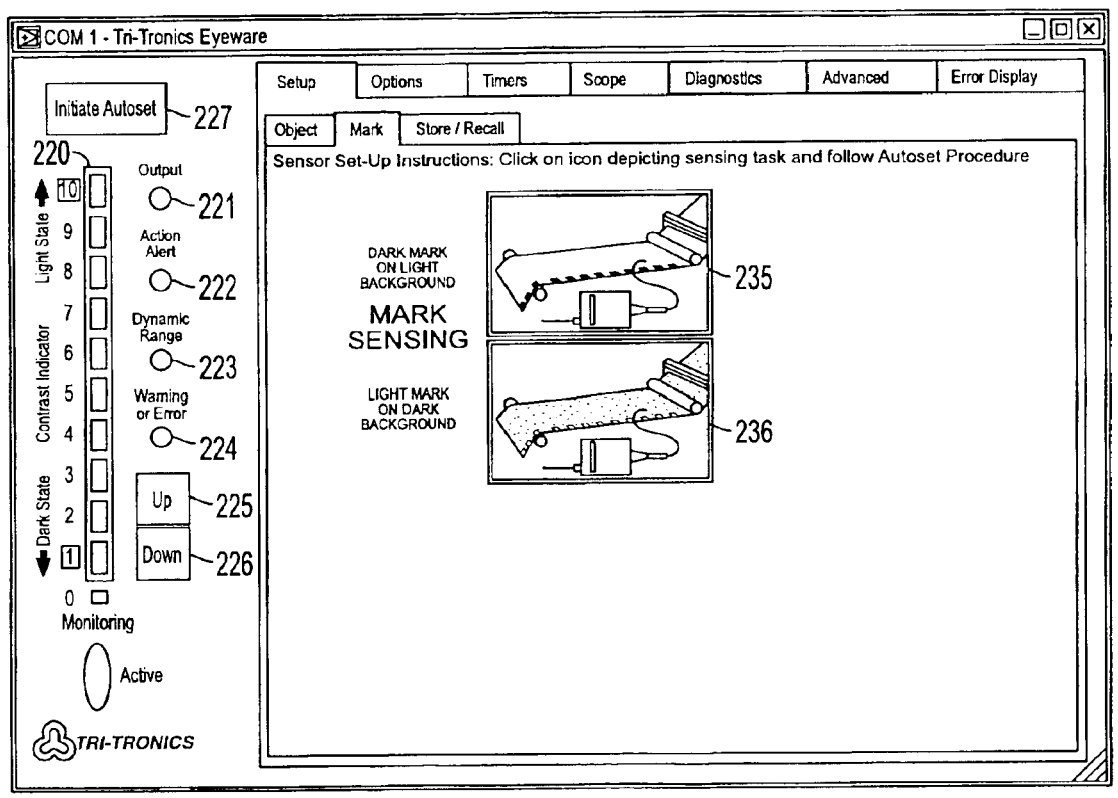

In accordance with the present invention, a novel software application is provided, which is executed by computer 11 and which generates a plurality of graphic user interfaces (GUIs) for facilitating the programming/setting/adjusting of the sensor 14. As shown in FIGS. 2a and 2b, the main GUI provides a plurality of folder icons set forth in the form of a menu bar extending across an upper section of the display. In the current embodiment, the accessible folders are labeled: 1) Setup, 2) Options, 3) Timers, 4) Scope, 5) Diagnostics, 6) Advanced and 7) Error Display. The functions available by accessing these folders will be discussed in detail below.

Continuing, the GUI also provides a contrast indicator 220, which as described above, provides an indication of the intensity level of the received signal. The GUI further comprises an "output" indicator 221, which functions to indicate when an "output" event has occurred, and an action alert indicator 222. As explained below, the action alert indicator 222 functions to notify the operator that the sensor is making adjustments to the sensors digital offset each time an event occurs (event driven) to maintain proper contrast deviation by indicating when it makes an adjustment. The indicator 222 will extinguish if after the next input event proper contrast deviation is satisfied. If not it will continue to light.

The GUI also provides a dynamic range indicator 223, which functions to notify the operator that the sensor 14 is operating near the ends of its dynamic range, for both light and dark states. Beneath the dynamic range indicator 223 are two icons 225 and 226 labeled Up and Down, which allow the operator to incrementally increase and/or decrease the digital offset of the sensor 14. It is noted that the digital offset represents a numerical value in the microprocessor 50 between 0–255 that effectively subtracts from the digital signal amplitude to produce a value that falls in the range of digital values that represent the contrast indicator. When depressing the up (or down) button 225 a value of 4 is subtracted from (or added to) the offset value. In the current embodiment, a value of 4 is the equivalent to one bar on the contrast indicator 220. Thus, when you click the up or down icon, the program sends the up or down command to the sensor. The sensor receives the command and performs arithmetic subtraction or addition of a value of 4 to the offset register in the microprocessors' memory. The microprocessor 50 then stores the new offset value to the sensor's memory 51. Now that the offset has changed the original signal that projected, for example, a value 8 in the contrast indicator now will project a value of 9 or 7 because of the change to the offset register value.

The GUI also comprises a "Warning or Error" LED 224 as shown in FIG. 2a. This LED will light if the sensor 14 detects a communication error which shows up under the error tab or when the offset value is at a value depicted by the red area on the offset dial in the diagnostic tab (see, FIG. 7).

In addition to the foregoing, the GUI also provides an Initiate Autoset icon 227. As explained below in greater detail, the selection of the Initiate Autoset icon 227 begins a calibration routine which will optimize the sensor 14 for the selected mode of operation, and for the given sensing task/environment. The GUI also includes a Recall icon 311 and a Store icon 312 (see, FIG. 3). Selection of the Store icon 312 results in the CPU 11 (contained in the computer) retrieving the current settings from the sensor 14, and in the current embodiment, the sensor 14 serial number. The CPU 11 then stores these settings in memory (e.g., contained in CPU 11) for later recall. Of course, it is also possible to store multiple setup configurations in the memory 51 contained in the sensor 14, provided the sensor's memory 51 contains adequate available memory capacity. In the current embodiment, it is preferable to store the sensor settings in the sensor's memory 51 as the settings are particular to the given sensor 14.

Selection of the Recall icon 311 results in the system displaying all of the previously stored operating configurations. Upon selection of one of the previously stored operating configurations, the system automatically reprograms the sensor 14 to operate in accordance with the stored settings. Moreover, as the system also stores the serial number of the sensor 14 along with the given operating configuration, when reprogramming the sensor 14 coupled to the system, the CPU 11 will check the serial number of the sensor 14 currently coupled thereto, and if it is different from the sensor serial number associated with the recalled settings, will notify the operator. Importantly, as a result of the communication protocol utilized to exchange data between the sensor 14 and the computer 11, there is no need to stop operation of the sensor 14 when retrieving sensor settings, or updating the sensor to operation in a different mode.

FIGS. 2a and 2b illustrate exemplary GUI set-up screens. As shown, the GUI set-screen has three sub-folders identified as "Object", "Mark" and "Store/Recall". Referring to FIG. 2a, the exemplary "Object" GUI screen provides for the choice/selection of four different modes of operation which are: 1) beam break sensing for opaque, translucent or transparent objects (retroflective mode), 2) beam break sensing for opaque or translucent objects (opposed mode), 3) beam make sensing for opaque, translucent or transparent objects (proximity mode), and 4) beam make for sensing opaque, translucent or transparent objects (convergent mode). In the preferred embodiment, each mode of operation is provided as a separate icon 211–218. In addition, each mode of operation has two corresponding icons, one directed to a set-up utilizing fiber-optic cables (icons 211, 213, 215 and 217) to emit and receive the optical signal, and the other (icons 212, 214, 216 and 218) directed to a set-up utilizing the sensor to emit and receive the optical signal. In order to select a given mode of operation, the operator simply selects the corresponding icon, which can be accomplished, for example, by means of a mouse input. In other words, utilizing a standard mouse coupled to the computer, the operator simply moves the cursor over the desired mode of operation and clicks the mouse.

As is well known, the sensor settings necessary for proper operation is different for each of the foregoing four modes of operation. As stated, the preferred sensor settings for each mode of operation are stored in memory contained in the computer 11. Upon selection of a given mode of operation by the operator, the computer 11 automatically commands/programs the sensor 14 to the desired configuration. Specifically, upon selection of a desired mode of operation by the operator via selection of the appropriate icon 211–218, the computer 11 forwards the settings/commands corresponding to the selected mode of operation to the microprocessor 50 contained in the sensor 14 via the RS-232 serial bus link 99. Upon receipt of these settings/commands, the microprocessor 50 contained in the sensor 14 functions to adjust the settings of the sensor 14 accordingly. Thus, simply by selection of the desired mode of operation, the sensor 14 is automatically programmed to operate in the preferred configuration. It is further noted that in the preferred embodiment, the set-up GUI screen provides illustrations of the four modes of operation in the corresponding icon 211–218. Also, upon selection of the desired mode of operation, the sensor will automatically perform the Autoset routine, which instructs the operator regarding the steps necessary to set-up and/or calibrate the sensor in the selected mode of operation for the given sensing task to be accomplished.

FIG. 2b illustrates the exemplary GUI screen associated with the Mark sub-folder of the GUI setup screen. As shown, the Mark sub-folder comprises two icons 235 and 236 which are directed to a mark sensing mode of operation. Specifically, the GUI screen provides an option for sensing a dark mark on a light background (icon 235) and an option for sensing a light mark on a dark background (icon 236). As with the other modes of operation, upon selection of one of the icons, the computer 11 programs the sensor 14 to the settings necessary to perform the selected mark sensing task, and instructs the operator to perform the necessary setup/calibration routine for the given mark sensing task.

Figure 3:
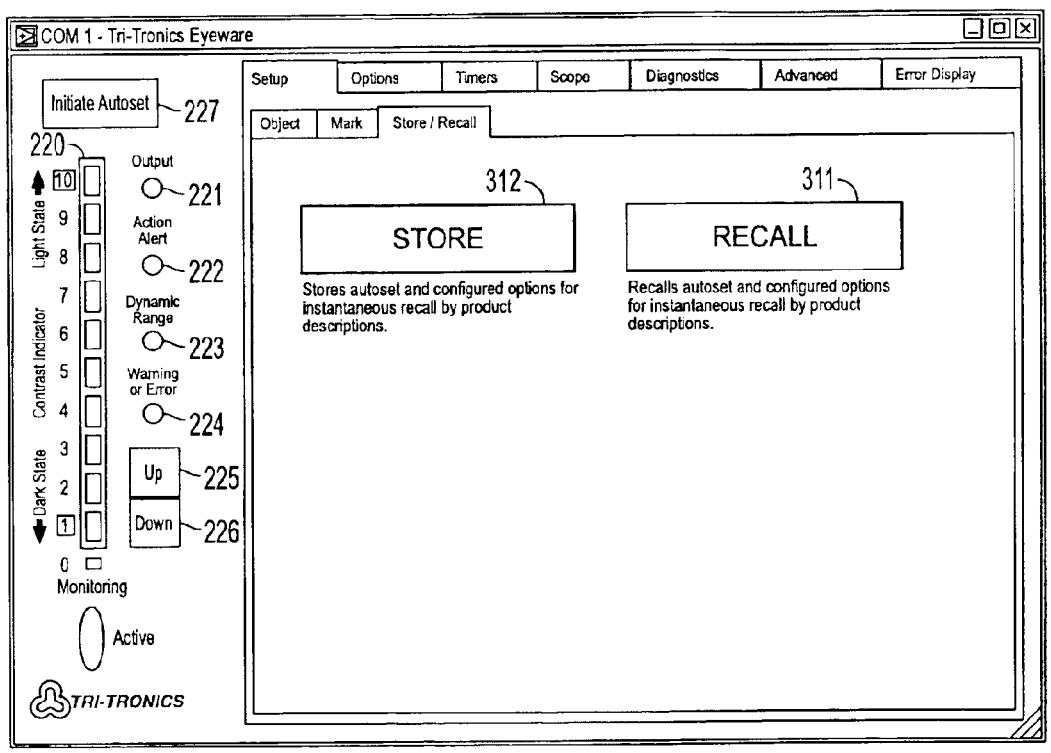
FIG. 3 illustrates an exemplary screen shot of an operating screen which allows the operator to save current sensor settings (i.e., performance parameters) to memory, or to recall previously saved sensor settings from memory.

Referring to FIG. 3, the final sub-folder in the GUI setup screen is the Store/Recall sub-folder. As noted above, the GUI screen associated with the Store/Recall sub-folder contains a Recall icon 311 and a Store icon 312. The operation of the system when selecting either the Recall icon 311 or the Store icon 312 has been detailed above.

Figure 4:
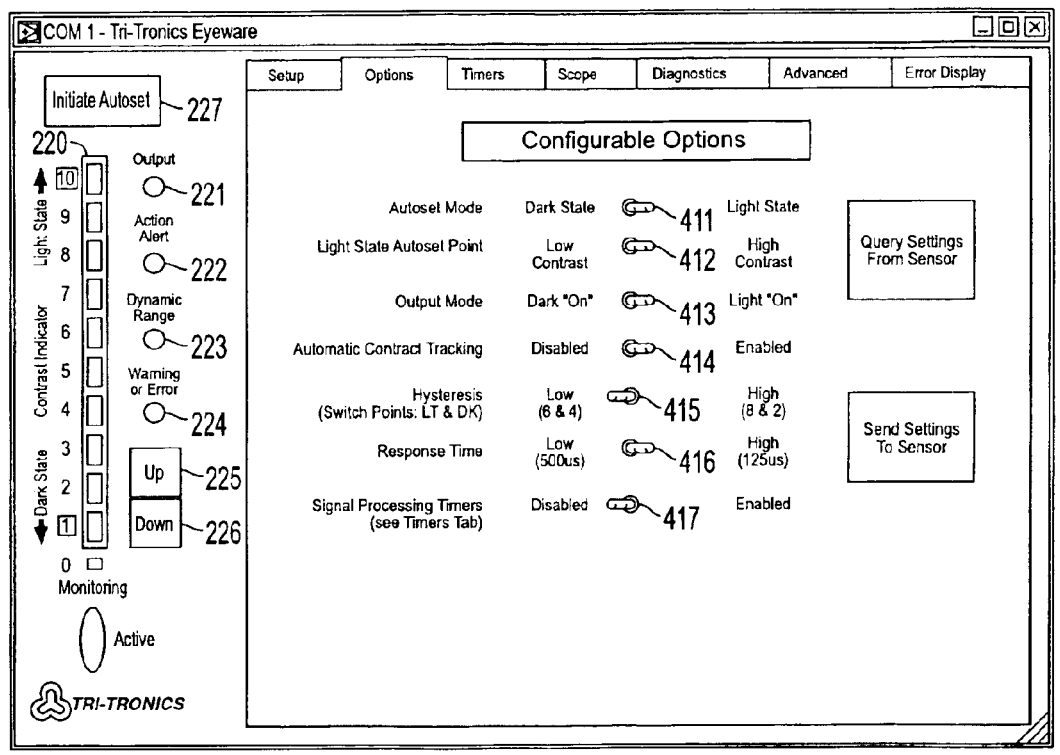
FIG. 4 illustrates an exemplary GUI option screen regarding performance parameters of the photoelectric sensor variable by the operator.

FIG. 4 illustrates an exemplary GUI option screen. As shown, in the given embodiment the option screen identifies seven performance attributes/parameters of the sensor 14, which can be controlled/varied via this screen simply by utilizing an input device 13 (e.g., a computer mouse) coupled to the computer 11. In order, the attributes are: 1) Autoset Mode, 2) Light State Autoset Point, 3) Output Mode, 4) Automatic Contrast Tracking, 5) Hysteresis, 6) Response Time and 7) Signal Processing Timers. As set forth above, upon selection of a given mode of operation from the Setup screen, the system will automatically program each of the seven attributes into a predetermined state, which is optimal for the selected mode of operation. However, in the event the operator wishes to change one or more performance attributes, the operator simply selects the attribute by placing the cursor over the appropriate toggle switch icon (411–417) corresponding to the attribute and then clicks the mouse to toggle the attribute to the alternate state (i.e., the seven attributes set forth in FIG. 4 are capable of operation in one of two states). The computer 11 functions to adjust the sensor 14 by forwarding the necessary commands/instructions to the sensor 14 so as to program the sensor via the RS-232 serial bus 99. A brief description of the functionality controlled by each of the seven performance attributes is now provided.

The first performance attribute "Autoset Mode" determines if the sensor 14 will set the demodulated signal at the dark state condition or the light state condition (above or below the switch point) necessary for proper operation in a given sensing environment, for either the light state or dark state mode of operation. This is accomplished by determining the amount of digital offset required to force the sensor 14 into the light or dark state condition. As set forth above, upon selecting Initiate Autoset icon 227, the system will request the operator's assistance in placing an object to be sensed in the desired sensing environment, and will then determine the led intensity, if high or low gain mode is needed and digital offset settings required for acceptable performance (i.e., detection of the desired output event).

In the preferred embodiment, in the light state mode, the sensor 14 is automatically adjusted to a light state set point slightly above 10 (in low contrast mode) on the contrast indicator 220, which assists preventing the sensor 14 from responding to objects in the background at the sensing site. In the dark state mode, the sensor 14 is automatically adjusted to a dark state set point slightly below 1 on the contrast indicator 220, which can be useful for obtaining the longest possible sensing range when operating in the proximity-beam make mode.

The "Light State Autoset Point" performance attribute represents the level at which the sensor 14 sets itself when the Autoset command is executed. As shown, this performance attribute can be toggled between a low contrast or a high contrast sensing task. The "Light State Autoset Point" performance attribute allows the light state autoset routine to accommodate either a low-contrast sensing task or a high-contrast sensing task. When attempting to resolve a low-contrast sensing task, it is desirable for the light state Autoset routine to adjust the offset to obtain a lower initial set point or excess gain above the threshold. When resolving a high-contrast sensing task, it is advantageous for the light state Autoset routine to adjust the digital offset to obtain a higher initial set point or excess gain above the threshold. The "excess gain" set point is defined as the degree or level of signal above the signal level necessary to trip the output of the sensor 14. In the current embodiment, the low contrast or high contrast Autoset points are selected and can be stored in the system memory. At this time the performance feature affects only light state set points. However, this feature is not limited to the light state condition. It can also have merit with dark state setups.

The output mode selection attribute allows the sensor's 14 output transistors to be configured in either the "light on" or "dark on" mode. In the "light on" mode the output devices (transistors) are in the energized state when the signal is above the light-state switch point as determined by the hysteresis selection (e.g., 6 or 8 on the contrast indicator). When the "dark on" mode is selected, the output devices (e.g., transistors) are energized when the signal level is below the dark-state switch point as determined by the hysteresis selection (e.g., 4 or 2 on the contrast indicator).

The next performance attribute, is "Automatic Contrast Tracking" which was described above. As indicated in FIG. 4, the ACT option can be either enable or disabled via the Options GUI screen.

The "Hysteresis" performance attribute provides the operator with the ability to switch between low hysteresis and high hysteresis modes of operation. As is known, it is common for photosensors to have a level of hysteresis so as to prevent the output of the sensor from chattering, as a result of, for example, electrical interference. In the current embodiment, the operator can select between low hysteresis and high hysteresis mode of operation. When utilizing low hysteresis, the dark state trip point corresponds to the fourth bar on the contrast indicator 220, while the light state trip point corresponds to the sixth bar. When utilizing high hysteresis, the dark state trip point corresponds to the second bar on the contrast indicator 220, while the light state trip point corresponds to the eighth bar. While the preferred setting is typically the low hysteresis setting, the high hysteresis setting could be utilized in a sensing environment wherein there is severe vibration of the objects stopped in front of the sensor 14.

The "Response Time" performance attribute allows the operator to select between a low response time and a high response time. In the current embodiment, the operator can select between a low response time of 500 usec and a high response time of 125 usec. In general, it is advantageous to have a high speed of response from the sensor 14 that triggers an output event (e.g., triggering an ink jet printer to print). A small or lesser delay in switching the sensor output results, for example, in the ink from the ink jet printer landing on the object at the same location independent of variations in the velocity of the moving target. Accordingly, for a vast majority of applications, the 125 usec response is the desired choice. However, in some applications, it can be advantageous to slow down the response time of the sensor to 500 usec. For example, when attempting to respond to printed registration marks on paper materials, slowing the response time desensitizes the sensor 14 so as to avoid responding to minor surface blemishes that pass rapidly through the sensors light beam.

The final performance attribute contained in the Options GUI set forth in FIG. 4 is "Signal Processing Timers". Utilizing this performance attribute, the operator can either enable or disable timers, which operate to control the response of the sensor 14 in conjunction with leading and trailing edges of received pulses as explained below.

It is once again noted that upon selection of a single mode of operation from the Setup icons (211–218 and 235, 236), the system automatically sets all of the foregoing performance attributes so as to optimize the sensor 14 for the selected mode of operation, and instructs the operator regarding the setup/calibration procedure for properly setting the sensor. These preferred settings are predetermined and stored in memory within the system. Accordingly, the present system essentially allows for "one-touch" operation.

Figure 5:
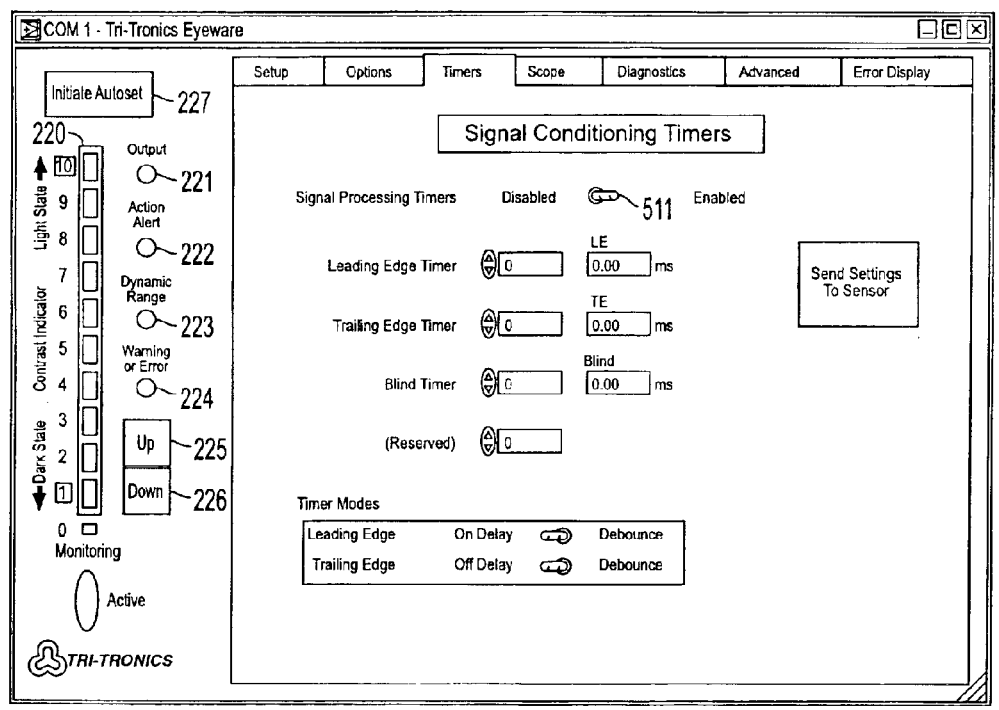
FIG. 5 illustrates an exemplary GUI option screen regarding timing options of the photoelectric sensor variable by the operator.

Continuing now with the folders contained in GUI setup screen, selectable by the operator, the next folder to be discussed is the "Timer" folder. Referring to FIG. 5, assuming the "signal processing timers" are enabled, which can be accomplished by selecting the icon 511, the current embodiment of the system allows the operator to control three separate timers, which are: 1) the leading edge timer, 2) the trailing edge timer and 3) the blind timer. The leading edge timer functions to delay an output response from the sensor 14 for a predetermined period of time. In other words, an input event that is sufficient to trigger an output event by the sensor 14 will only do so if the input event remains "on" longer than the predetermined period of time. Similarly, the trailing edge timer functions to delay the return to the "off" state until the sensor input event remains "off" longer than the predetermined period of time. Finally, the blind timer can be selected to prevent the output of the sensor 14 from returning to the non-detection state during an input event. Typically, the blind timer is utilized to ignore short duration responses to undesired targets. As mentioned above, the system allows the operator to simply adjust the timer setting of the sensor by accessing the Timer folder and adjusting the timers as desired. In the current embodiment, the actual timers are contained within the sensor 14, and continue to operate even if the computer 12 is disconnected from the sensor 14. The operator may also activate debounce timers.

The next folder is the "Scope" folder. To summarize, selection of the scope folder allows the operator to view a time-based plot of the intensity level of the received signal, and plot it against the dynamic range of the sensor. In other words, the scope folder allows the operator to view a time-based plot of the actual analog signal caused by the emitted light beam being effected by the target moving through the effective beam of the sensor 14 plotted against the dynamic range of the sensor 14. The computer 11 utilizes the data associated with the intensity of the received signal in combination with the current sensor settings to generate the plot, which is referred to as the contrast analyzer plot. Importantly, the plot is provided in substantially real time.

Figure 6A:
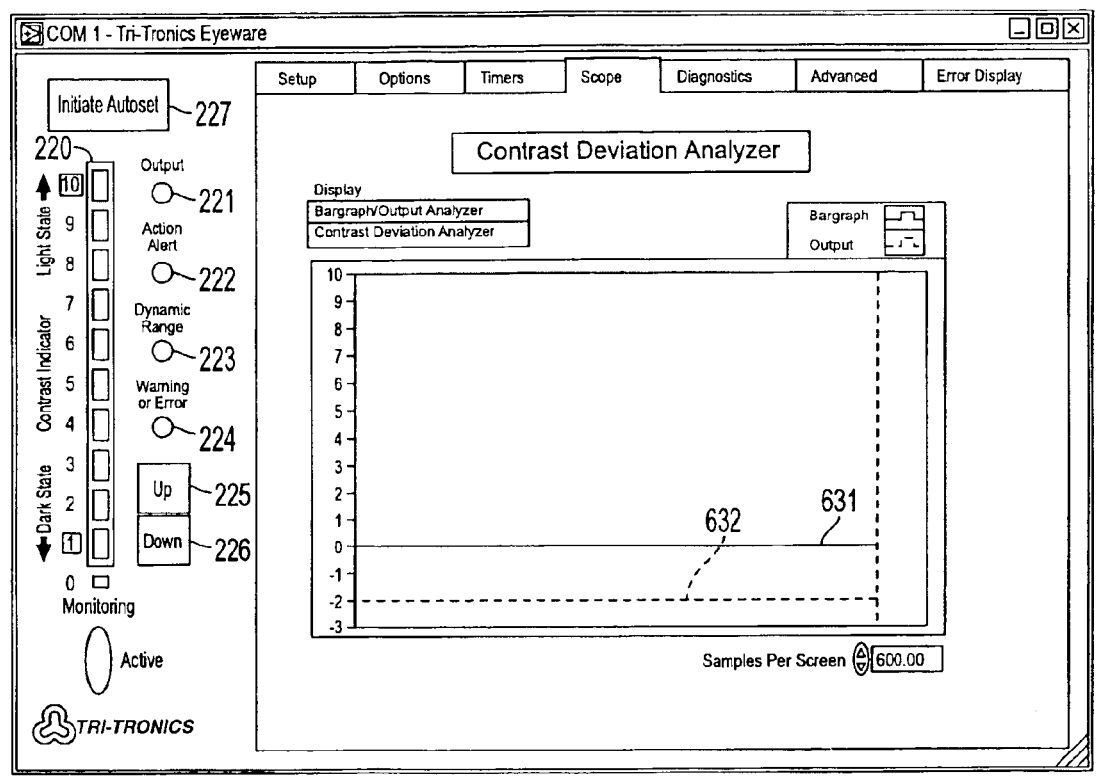
FIGS. 6a and 6b illustrate exemplary screen shots of the "Scope" options available to the operator to analyze the performance of the photoelectric sensor.
Figure 6B:
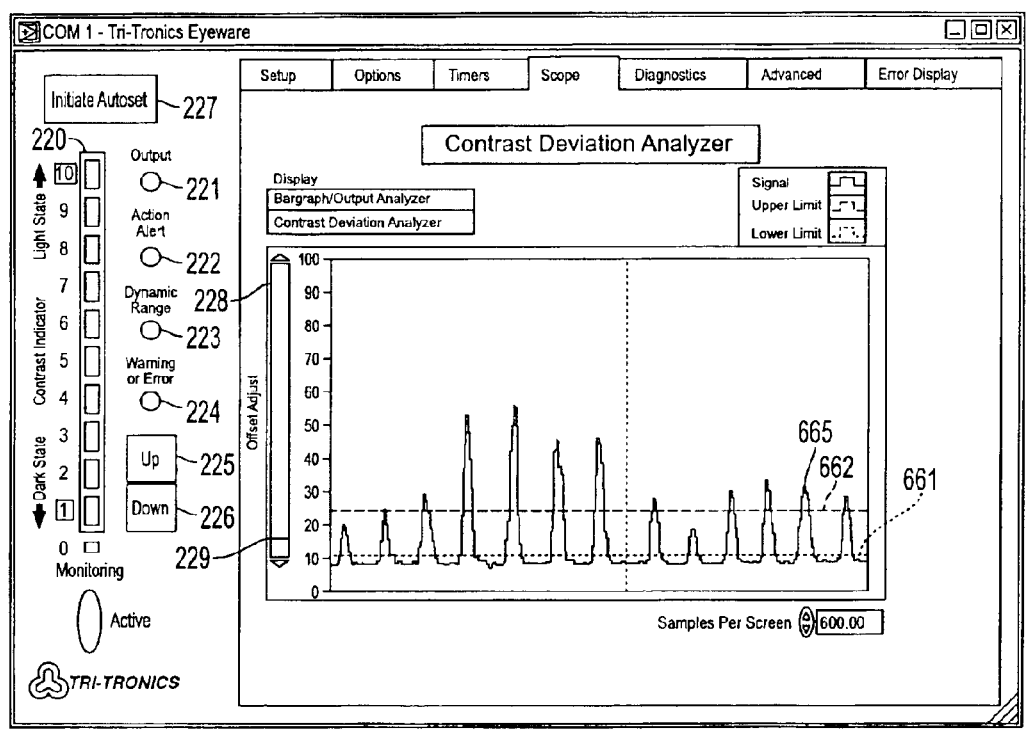

FIGS. 6a and 6b illustrate examples of the plots currently accessible by the operator. First, as shown in FIG. 6a, there is the Bargraph/Output Analyzer plot. In the given embodiment, the Bargraph/Output Analyzer plot contains two lines, the first line 631 is essentially a mirror image to the signal displayed by the contrast indicator, so as to allow the operator to plot the contrast over time. The second line 632 illustrates the state of the output. Specifically, a "−2" for output off and a "−1" for output on. This allows the operator to obtain a graphical plot of the output state.

FIG. 6b illustrates an example of the contrast deviation analyzer plot. As shown, the contrast deviation analyzer plot contains a red reference line 661 and a green reference line 662. The red reference line 661 corresponds to a "0" on the contrast indicator meter 220, while the green reference line 662 corresponds to a "10" on the contrast indicator meter 220. The exemplary square wave line 665 corresponds to actual inputs events to the sensor 14. Specifically, in the current example, each pulse indicates that an object has been detected by the sensor 14.

Importantly, because the contrast deviation analyzer allows the operator to view the actual analog signal corresponding to the received signal, the operator can analyze the exact response of the sensor 14, and then determine why a problem exists (if one does), as well as to readily adjust the sensor 14 for the optimal settings for a given application. Indeed, the contrast deviation analyzer allows the operator to quickly and easily diagnose and correct problems that were basically undetectable prior to development of the contrast deviation analyzer.

More specifically, referring to FIG. 6b, by utilizing this scope-like feature of the present invention, the operator is able to determine exactly how to locate the trip points to eliminate problem measurements. For example, assuming the sensor 14 was set such that both the red line 661 and green line 662 were positioned within a chatter region, the sensor 14 would provide an erroneous output signal each time the signal 665 went below the red line 661 during the chatter region. However, this scope-like feature of the contrast deviation analyzer allows the operator to instantly detect these erroneous output readings and adjust the red line 661 such that it is sufficiently below the chatter so as to prevent the error.

It is further noted that in one embodiment, the present invention allows for adjustment of the settings simply by clicking on either the red line 661 or the green line 662 and dragging the line to the desired location. The computer 51 automatically adjusts the sensor settings accordingly (i.e., adjusts the offset setting in accordance with the end location of the lines). As explained below, in the current embodiment, the red and green lines cannot move separately. The lines are always fixed distance apart. By clicking in a bar control area 228 on the midpoint location 229 between the red and the green line, the lines 661–662 will move to the point the operator drags it to, and the offset will be automatically adjusted in accordance with the new location. Accordingly, the system eliminates the need for performing a trial and error fix when attempting to eliminate errors such as described above. By simply viewing the contrast deviation analyzer plot, the operator can readily determine where to locate the trip points of the sensor, which are defined relative to the location of the red and green lines, so as to eliminate such errors.

Referring again to FIG. 6b, as stated above, the red and green lines (661 and 662) set forth in the contrast deviation analyzer plot correspond to the current settings as depicted by the contrast indicator meter 220. However, importantly, the contrast deviation analyzer plot allows the operator to view the actual dynamic range of the sensor 14. The area of the plot outside of the red and green lines (661 and 662) represent the excess dynamic range currently available. The area between the red and green lines represents the area in which the sensor is currently operating. Thus, by changing the placement of the red and green lines, the operator effectively changes where the sensor 14 is operating within the available (i.e., total) dynamic range of the sensor 14. In the current embodiment, the red and green lines are fixed relative to one another. In other words, when positioning the lines, the lines move in unison with one another, such that size of the window of dynamic range within which the sensor operates is fixed. It is again noted that prior to the present system, the operator had no means of determining the available dynamic range or where the sensor 14 was currently operating within the available dynamic range.

Figure 7:
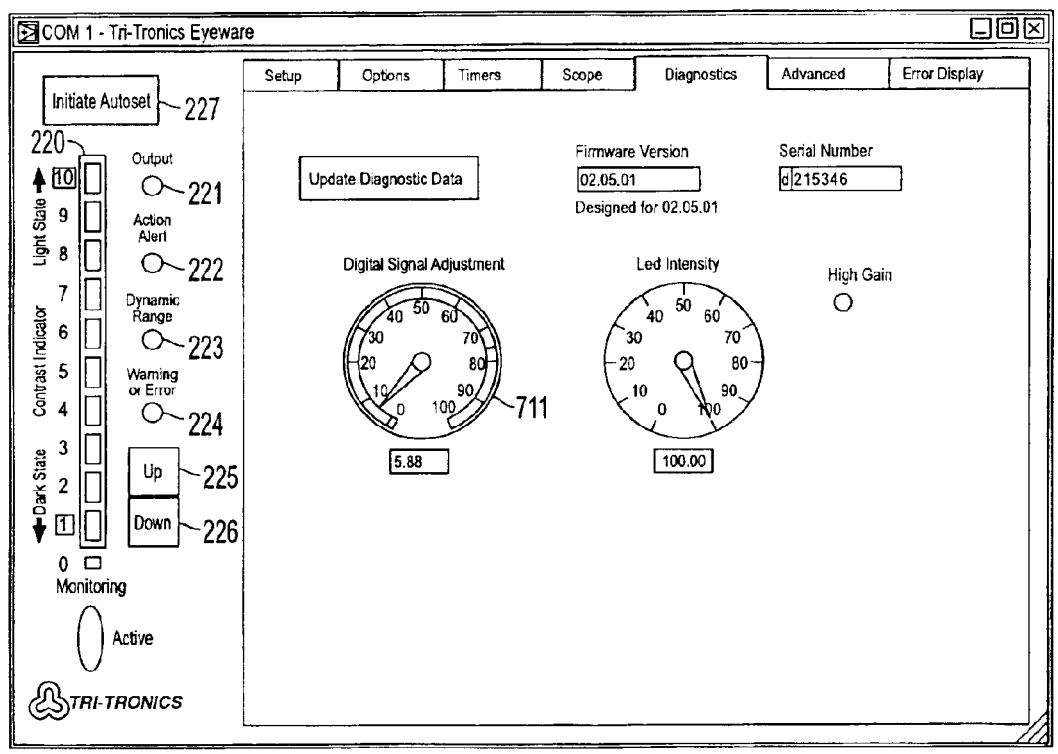
FIG. 7 illustrates an exemplary screen shot of the "Diagnostic" options available to the operator to evaluate the current operating status of the photoelectric sensor.

The next folder to be discussed is the "Diagnostics Folder". Referring to FIG. 7, the GUI associated with the diagnostics folder allows the operator to readily determine when the sensor 14 is about to have insufficient dynamic range to operate properly. As shown, the GUI includes a digital signal adjustment meter 711 (or offset indicator) and an LED intensity meter 712. In operation, when the offset is adjusted to far to one extreme (for example, when operating in the proximity mode and the object to be detected is too far out of view, or when operating in the beam break mode and too much dirt accumulates on the lens, etc.), the needle enters the red region and turns on the warning indicator. This informs the operator that the sensor 14 is about to run out of adjustment room. If the auto adjust tries to continue to make changes in the direction of the extremes at some point the sensor 14 will no longer be able to adjust and the sensor 14 will start to loose dynamic operating range. The LED intensity meter 712, as the name suggests, indicates how hard the LED is being driven. Accordingly, by viewing these meters 711 and 712, the operator can discern when the sensor is running out of dynamic range (i.e., too light or too dark).

Figure 8:
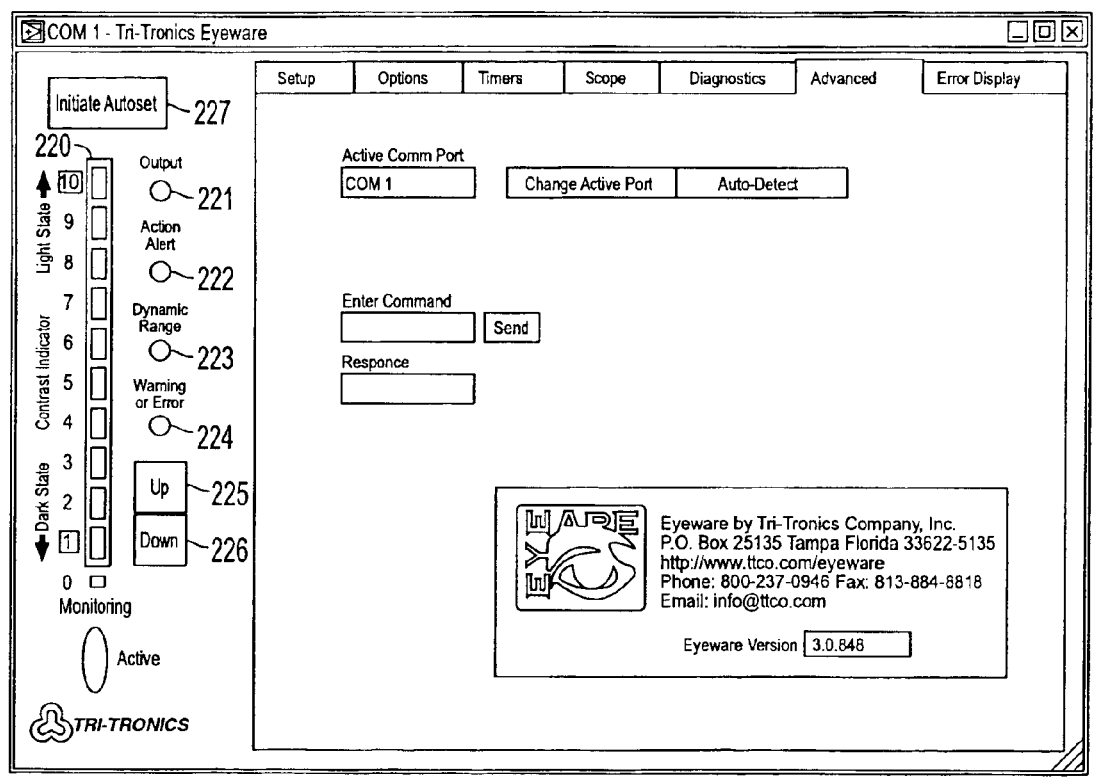
FIG. 8 illustrates an exemplary screen shot of the "Advanced" options available to the operator.
Figure 9:
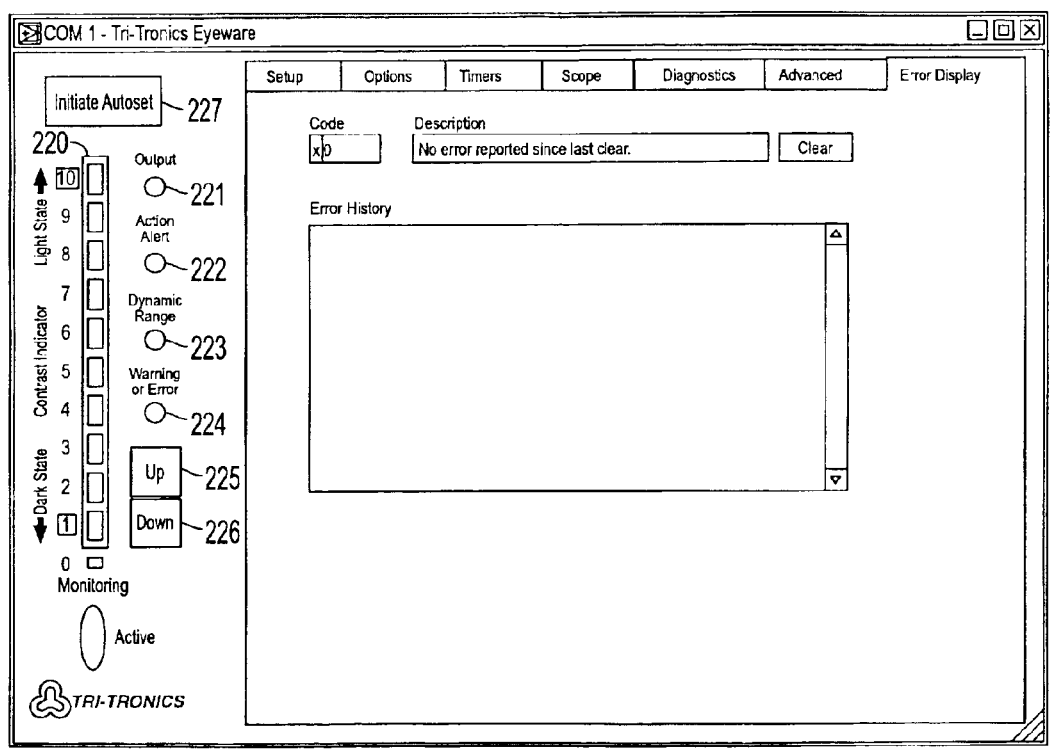
FIG. 9 illustrates an exemplary screen shot of the "Error Display" operator interface.

FIG. 8 illustrates an exemplary screen shot of the "Advanced" options available to the operator. As shown, the Advanced GUI is utilized to change or autodetect which communication port the sensor is on. FIG. 9 illustrates an exemplary screen shot of the "Error Display" operator interface, which is utilized to determine and log the errors that have occurred.

As noted above, the system and photoelectric sensor of the present invention provide significant advantages over the prior art. Most importantly, the present invention allows even the novice operator to easily and quickly set-up the sensor to perform a given sensing task by viewing and selecting the desired sensing mode via icons displayed on a graphical user interface (GUI). Upon selection of the desired sensing mode, the system automatically configures the setting of the photoelectric sensor such that the sensor is operable in the desired sensing mode. Thus, an operator with essentially no experience regarding the requirements for operating a photoelectric sensor can perform the set-up operation in an efficient, simple manner.

Another advantage of the present invention is that it allows the operator to monitor the actual response of the sensor on a contrast indicator built into the photoelectric sensor in the form of an LED array, or by utilizing a graphic display oscilloscope style contrast deviation analyzer. The contrast deviation analyzer charts the signal level deviation of the received signal against the background of the dynamic range of the sensor while monitoring on-going input events. This allows the operator to view the actual response of the sensor on a substantially real time basis, and adjust the performance parameters of the sensor to optimize sensor performance to the specific sensing task.

Yet another advantage of the photosensor of the present invention is that once the performance parameters are determined for a particular sensing task, these performance parameters can be stored in memory in the photosensor. As a result, if the sensor is utilized for multiple sensing tasks, the optimal performance parameters can be recalled from memory and utilized to control/program the sensor to restore the recalled performance parameters, thereby eliminating the need for the operator to re-perform the set-up process.

It is further noted that once a given sensor 14 of the present invention is programmed utilizing the computer device 12, the computer device 12 can be disconnected from the given sensor 14. As the sensor 14 comprises its own internal memory and processor, all settings necessary for proper operation are maintain within the sensor. Thus, once programmed, the sensor 14 can maintain operation even though the computer device 12 was disconnected.

It is also noted that variations of the foregoing embodiments are also possible. For example, in one variation the system provides for the recording of the contrast deviation analyzer plot for a given period of time so as to allow the operator replay the response subsequent to the recordation. The system further allows the operator to manipulate the speed of the playback so as to allow the operator, for example, to view detection events occurring to quickly for the operator to view on a real time basis. In another variation, the system allows the operator to take "snapshots" of the contrast deviation analyzer plot.

In yet another variation, the system provides a "HELP" screen or menu accessible via the GUI, which provides the operator various types of information regarding the selected mode of sensing, the operation of the sensor in the given mode, etc. The "HELP" screen can be utilized to provide any knowledge deemed relevant and useful to the operator.

Although certain specific embodiments of the present invention have been disclosed, it is noted that the present invention may be embodied in other forms without departing from the spirit or essential characteristics thereof. The present embodiments are therefor to be considered in all respects as illustrative and not restrictive, the scope of the invention being indicated by the appended claims, and all changes that come within the meaning and range of equivalency of the claims are therefore intended to be embraced therein.

What is claimed is:

1. A system for programming a photoelectric sensor and for monitoring the performance of said photoelectric sensor, said system comprising:

an external processor coupled to said photoelectric sensor via a data port provided on said photoelectric sensor, said external processor operative for generating at least one graphical user interface and for programming the operation of said photoelectric sensor; and an external display device coupled to said external processor for displaying said at least one graphical user interface;

said external processor controlling an internal processor contained in said photoelectric sensor in accordance with a selection of an operator utilizing said at least one graphical user interface, wherein said at least one graphical user interface depicts a plurality of modes of operation for said photoelectric sensor, said external processor programming said photoelectric sensor to operate in a given one of said plurality of modes of operation upon selection of said given mode of operation via said at least one graphical user interface, and wherein said plurality of modes of operation of said photoelectric sensor include a beam break mode of operation, a beam make mode of operation and a mark sensing mode of operation.

2. A system for programming a photoelectric sensor and for monitoring the performance of said photoelectric sensor according to claim 1, wherein each of said plurality of modes of operation is represented utilizing a separate icon.

3. A system for programming a photoelectric sensor and for monitoring the performance of said photoelectric sensor according to claim 1, wherein said system further comprises a memory device, said memory device having a plurality of prestored configuration settings, each of said plurality of prestored configuration settings corresponding to a given mode of operation of said photoelectric sensor.

4. A system for programming a photoelectric sensor and for monitoring the performance of said photoelectric sensor according to claim 3, wherein upon selection of a mode of operation by said operator, said external processor retrieves the corresponding prestored configuration settings from said memory device and programs said photoelectric sensor in accordance with the retrieved configuration settings.

5. A system for programming a photoelectric sensor and for monitoring the performance of said photoelectric sensor according to claim 3, wherein said at least one graphical user interface comprises a store settings icon which, when selected by said operator, results in the storage of current operational settings of said photoelectric sensor in said memory device.

6. A system for programming a photoelectric sensor and for monitoring the performance of said photoelectric sensor according to claim 5, wherein said current operational settings of said photoelectric sensor includes a serial number of said photoelectric sensor.

7. A system for programming a photoelectric sensor and for monitoring the performance of said photoelectric sensor according to claim 3, wherein said at least one graphical user interface comprises a recall settings icon which, when selected by said operator, results in the retrieval of any previously stored operational settings of said photoelectric sensor from said memory device.

8. A system for programming a photoelectric sensor and for monitoring the performance of said photoelectric sensor according to claim 7, wherein said stored operational settings of said photoelectric sensor includes a serial number of said photoelectric sensor.

9. A system for programming a photoelectric sensor and for monitoring the performance of said photoelectric sensor according to claim 1, wherein said depiction of each of said plurality of modes of operation includes an illustration of the operation of said photoelectric sensor in said mode of operation.

10. A system for programming a photoelectric sensor and for monitoring the performance of said photoelectric sensor according to claim 1, wherein said at least one graphical user interface includes a contrast indicator, said contrast indicator comprising a bar graph.

11. A system for programming a photoelectric sensor and for monitoring the performance of said photoelectric sensor according to claim 1, wherein said at least one graphical user interface includes an output event indicator, said output event indicator being activated upon occurrence of an output event.

12. A system for programming a photoelectric sensor and for monitoring the performance of said photoelectric sensor according to claim 1, wherein said at least one graphical user interface includes a dynamic range indicator, which is activated when said photoelectric sensor is operating near or out of the limit of the available dynamic range.

13. A system for programming a photoelectric sensor and for monitoring the performance of said photoelectric sensor according to claim 1, wherein said at least one graphical user interface includes a plurality of signal conditioning timer settings for controlling when said photoelectric sensor generates an output response, said external processor programming said photoelectric sensor in accordance with a selected signal conditioning timer setting.

14. A system for programming a photoelectric sensor and for monitoring the performance of said photoelectric sensor according to claim 1, wherein said at least one graphical user interface includes an LED intensity indicator.

15. A system for programming a photoelectric sensor and for monitoring the performance of said photoelectric sensor, said system comprising:

an external processor coupled to said photoelectric sensor via a data port provided on said photoelectric sensor, said external processor operative for generating at least one graphical user interface and for programming the operation of said photoelectric sensor; and an external display device coupled to said external processor for displaying said at least one graphical user interface;

said external processor controlling an internal processor contained in said photoelectric sensor in accordance with a selection of an operator utilizing said at least one graphical user interface, wherein said at least one graphical user interface comprises icons representing a plurality of variable performance attributes of said photoelectric sensor, said operator being able to vary each performance attribute by selecting the icon corresponding to the given performance attribute, said external processor programming said photoelectric sensor to operate in accordance with the selected performance attribute, and wherein said plurality of variable performance attributes contained in said at least one graphical user interface include an autoset mode attribute, a light state autoset point attribute, an output mode attribute, an automatic contrast tracking attribute, a hysteresis attribute, a response time attribute and a signal processing timer attribute.

16. A system for programming a photoelectric sensor and for monitoring the performance of said photoelectric sensor according to claim 15, wherein said at least one graphical user interface provides a display of the level of a signal received by said photoelectric sensor.

17. A system for programming a photoelectric sensor and for monitoring the performance of said photoelectric sensor according to claim 16, wherein said at least one graphical user interface provides the display of the level of the signal received by said photoelectric sensor on a substantially real time basis.

18. A system for programming a photoelectric sensor and for monitoring the performance of said photoelectric sensor, said system comprising:

an external processor coupled to said photoelectric sensor via a data port provided on said photoelectric sensor, said external processor operative for generating at least one graphical user interface and for programming the operation of said photoelectric sensor; and an external display device coupled to said external processor for displaying said at least one graphical user interface;

said external processor controlling an internal processor contained in said photoelectric sensor in accordance with a selection of an operator utilizing said at least one graphical user interface.

wherein said at least one graphical user interface provides a plot of the level of a signal received by said photoelectric sensor contrasted against the dynamic range of the photoelectric sensor versus time.

19. A system for programming a photoelectric sensor and for monitoring the performance of said photoelectric sensor according to claim 18, wherein said at least one graphical user interface provides said plot on a substantially real time basis.

20. A system for programming a photoelectric sensor and for monitoring the performance of said photoelectric sensor according to claim 19, wherein said external display device further includes a first line and a second line defining a portion of the dynamic range of the photoelectric sensor, said photoelectric sensor having a first trip point defined relative to the position of said first line, and said photoelectric sensor having a second trip point defined relative to the position of said second line.

21. A system for programming a photoelectric sensor and for monitoring the performance of said photoelectric sensor according to claim 20, wherein said first line and said second line are movable by selecting a bar control area on said at least one graphical user interface, said first line and said second line moving in unison with one another, said first trip point and said second trip point of said photoelectric sensor being adjusted in accordance with the new position of said first line and said second line.

22. A system for programming a photoelectric sensor and for monitoring the performance of said photoelectric sensor, said system comprising:
   an external processor coupled to said photoelectric sensor via a data port provided on said photoelectric sensor, said external processor operative for generating at least one graphical user interface and for programming the operation of said photoelectric sensor; and
   an external display device coupled to said external processor for displaying said at least one graphical user interface;
   said external processor controlling an internal processor contained in said photoelectric sensor in accordance with a selection of an operator utilizing said at least one graphical user interface,
   wherein once said photoelectric sensor is programmed by said external processor in accordance with selections made by an operator utilizing said at least one graphical user interface, said photoelectric sensor remains operational when disconnected from said external processor and said external display device.

23. A system for programming a photoelectric sensor and for monitoring the performance of said photoelectric sensor according to claim 22, wherein said external processor communicates with said photoelectric sensor utilizing a serial interface.

24. A method for programming a photoelectric sensor and for monitoring the performance of said photoelectric sensor, said method comprising the steps of:
   generating at least one graphical user interface utilized for programming the operation of said photoelectric sensor, said at least one graphical user interface generated by an external processor, said external processor coupled to said photoelectric sensor via a data port provided on said photoelectric sensor; and
   displaying said at least one graphical user interface on an external display device;
   said external processor controlling said photoelectric sensor in accordance with a selection of an operator utilizing said at least one graphical user interface,
   wherein said at least one graphical user interface depicts a plurality of modes of operation for said photoelectric sensor, said external processor programming said photoelectric sensor to operate in a given one of said plurality of modes of operation upon selection of said given mode of operation via said at least one graphical user interface, and
   wherein said plurality of modes of operation of said photoelectric sensor include a beam break mode of operation, a beam make mode of operation and a mark sensing mode of operation.

25. A method for programming a photoelectric sensor and for monitoring the performance of said photoelectric sensor according to claim 24, further comprising the step of generating a separate icon for each of said plurality of modes of operation.

26. A method for programming a photoelectric sensor and for monitoring the performance of said photoelectric sensor according to claim 24, further comprising the step of storing a plurality of predetermined configuration settings in a memory device, each of said plurality of predetermined configuration settings corresponding to a given mode of operation of said photoelectric sensor.

27. A method for programming a photoelectric sensor and for monitoring the performance of said photoelectric sensor according to claim 26, wherein said at least one graphical user interface comprises a store settings icon which, when selected by said operator, results in the storage of current operational settings of said photoelectric sensor in said memory device.

28. A method for programming a photoelectric sensor and for monitoring the performance of said photoelectric sensor according to claim 27, wherein said current operational settings of said photoelectric sensor include a serial number of said photoelectric sensor.

29. A method for programming a photoelectric sensor and for monitoring the performance of said photoelectric sensor according to claim 26, wherein said at least one graphical user interface comprises a recall settings icon which, when selected by said operator, results in the retrieval of any previously stored operational settings of said photoelectric sensor from said memory device.

30. A method for programming a photoelectric sensor and for monitoring the performance of said photoelectric sensor according to claim 29, wherein said stored operational settings of said photoelectric sensor include a serial number of said photoelectric sensor.

31. A method for programming a photoelectric sensor and for monitoring the performance of said photoelectric sensor according to claim 24, wherein upon selection of a mode of operation by said operator, said external processor retrieves the corresponding predetermined configuration settings from a memory device and programs said photoelectric sensor in accordance with the retrieved configuration settings.

32. A method for programming a photoelectric sensor and for monitoring the performance of said photoelectric sensor according to claim 24, wherein said depiction of each of said plurality of modes of operation includes an illustration of the operation of said photoelectric sensor in said mode of operation.

33. A method for programming a photoelectric sensor and for monitoring the performance of said photoelectric sensor according to claim 24, wherein said at least one graphical user interface comprises icons representing a plurality of variable performance attributes of said photoelectric sensor, said operator being able to vary each performance attribute by selecting the icon corresponding to the given performance attribute, said external processor programming said photoelectric sensor to operate in accordance with the selected performance attribute.

34. A method for programming a photoelectric sensor and for monitoring the performance of said photoelectric sensor according to claim 33, wherein said plurality of variable performance attributes contained in said at least one graphical user interface include an autoset mode attribute, a light state autoset point attribute, an output mode attribute, an automatic contrast tracking attribute, a hysteresis attribute, a response time attribute and a signal processing timer attribute.

35. A method for programming a photoelectric sensor and for monitoring the performance of said photoelectric sensor according to claim 24, wherein said at least one graphical user interface provides a display of the level of a signal received by said photoelectric sensor.

36. A method for programming a photoelectric sensor and for monitoring the performance of said photoelectric sensor according to claim 35, wherein said at least one graphical user interface provides the display of the level of the signal received by said photoelectric sensor on a substantially real time basis.

37. A method for programming a photoelectric sensor and for monitoring the performance of said photoelectric sensor according to claim 35, wherein said external display device further includes a first line and a second line defining a portion of the dynamic range of the photoelectric sensor, said photoelectric sensor having a first trip point defined relative to the position of said first line, and said photoelectric sensor having a second trip point defined relative to the position of said second line.

38. A method for programming a photoelectric sensor and for monitoring the performance of said photoelectric sensor according to claim 37, wherein said first line and said second line are movable by selecting a bar control area on said at least one graphical user interface, said first line and said second line moving in unison with one another, said first trip point and said second trip point of said photoelectric sensor being adjusted in accordance with the new position of said first line and said second line.

39. A method for programming a photoelectric sensor and for monitoring the performance of said photoelectric sensor according to claim 24, wherein said at least one graphical user interface includes a contrast indicator, said contrast indicator comprising a bar graph.

40. A method for programming a photoelectric sensor and for monitoring the performance of said photoelectric sensor according to claim 24, wherein said at least one graphical user interface includes an output event indicator, said output event indicator being activated upon occurrence of an output event.

41. A method for programming a photoelectric sensor and for monitoring the performance of said photoelectric sensor according to claim 24, wherein said at least one graphical user interface includes a dynamic range indicator, which is activated when said photoelectric sensor is operating near or out of the limit of the available dynamic range.

42. A method for programming a photoelectric sensor and for monitoring the performance of said photoelectric sensor according to claim 24, wherein said at least one graphical user interface includes a plurality of signal conditioning timer settings for controlling when said photoelectric sensor generates an output response, said external processor programming said photoelectric sensor in accordance with a selected signal conditioning timer setting.

43. A method for programming a photoelectric sensor and for monitoring the performance of said photoelectric sensor according to claim 24, wherein said external processor communicates with said photoelectric sensor utilizing a serial interface.

44. A method for programming a photoelectric sensor and for monitoring the performance of said photoelectric sensors, said method comprising the steps of:

generating at least one graphical user interface utilized for programming the operation of said photoelectric sensor, said at least one graphical user interface generated by an external processor, said external processor coupled to said photoelectric sensor via a data port provided on said photoelectric sensor; and displaying said at least one graphical user interface on an external display device;

said external processor controlling said photoelectric sensor in accordance with a selection of an operator utilizing said at least one graphical user interface, wherein said at least one graphical user interface provides a plot of the level of a signal received by said photoelectric sensor contrasted against the dynamic range of the photoelectric sensor versus time.

45. A method for programming a photoelectric sensor and for monitoring the performance of said photoelectric sensor according to claim 44, wherein said at least one graphical user interface provides said plot on a substantially real time basis.

46. A method for programming a photoelectric sensor and for monitoring the performance of said photoelectric sensor, said method comprising the steps of:

generating at least one graphical user interface utilized for programming the operation of said photoelectric sensor, said at least one graphical user interface generated by an external processor, said external processor coupled to said photoelectric sensor via a data port provided on said photoelectric sensor; and displaying said at least one graphical user interface on an external display device;

said external processor controlling said photoelectric sensor in accordance with a selection of an operator utilizing said at least one graphical user interface, wherein once said photoelectric sensor is programmed by said external processor in accordance with selections made by an operator utilizing said at least one graphical user interface, said photoelectric sensor remains operational when disconnected from said external processor and said external display device.

47. A computer program product for controlling a computer comprising a recording medium readable by the computer, instructions recorded on the recording medium for programming a photoelectric sensor and for monitoring the performance of the photoelectric sensor by performing the steps of:

generating at least one graphical user interface utilized for programming the operation of said photoelectric sensor, said at least one graphical user interface generated by an external processor, said external processor coupled to said photoelectric sensor via a data port provided on said photoelectric sensor; and displaying said at least one graphical user interface on an external display device;

said external processor controlling said photoelectric sensor in accordance with a selection of an operator utilizing said at least one graphical user interface, wherein said at least one graphical user interface depicts a plurality of modes of operation for said photoelectric sensor, said external processor programming said photoelectric sensor to operate in a given one of said plurality of modes of operation upon selection of said given mode of operation via said at least one graphical user interface, and wherein said plurality of modes of operation of said photoelectric sensor include a beam break mode of operation, a beam make mode of operation and a mark sensing mode of operation.

48. The computer program product according to claim 47, further comprising the step of representing each of said plurality of modes of operation utilizing a separate icon.

49. The computer program product according to claim 47, further comprising the step of storing a plurality of predetermined configuration settings in a memory device, each of said plurality of predetermined configuration settings corresponding to a given mode of operation of said photoelectric sensor.

50. The computer program product according to claim 49, wherein upon selection of a mode of operation by said operator, said external processor retrieves the corresponding predetermined configuration settings from said memory device and programs said photoelectric sensor in accordance with the retrieved configuration settings.

51. The computer program product according to claim 49, wherein said at least one graphical user interface comprises a recall settings icon which, when selected by said operator, results in the retrieval of any previously stored operational settings of said memory device.

52. The computer program product according to claim 51, wherein said stored operational settings of said photoelectric sensor include a serial number of said photoelectric sensor.

53. The computer program product according to claim 47, wherein said depiction of each of said plurality of modes of operation includes an illustration of the operation of said photoelectric sensor in said mode of operation.

54. The computer program product according to claim 47, wherein said at least one graphical user interface comprises a store settings icon which, when selected by said operator, results in the storage of current operational settings of said photoelectric sensor in a memory device.

55. The computer program product according to claim 54, wherein said current operational settings of said photoelectric sensor include a serial number of said photoelectric sensor.

56. The computer program product according to claim 47, wherein said at least one graphical user interface comprises icons representing a plurality of variable performance attributes of said photoelectric sensor, said operator being able to vary each performance attribute by selecting an icon corresponding to the given performance attribute, said external processor programming said photoelectric sensor to operate in accordance with the selected performance attribute.

57. The computer program product according to claim 56, wherein said plurality of variable performance attributes contained in said at least one graphical user interface include an autoset mode attribute, a light state autoset point attribute, an output mode attribute, an automatic contrast tracking attribute, a hysteresis attribute, a response time attribute and a signal processing timer attribute.

58. The computer program product according to claim 47, wherein said at least one graphical user interface provides a display of the level of a signal received by said photoelectric sensor.

59. The computer program product according to claim 58, wherein said at least one graphical user interface provides the display of the level of the signal received by said photoelectric sensor on a substantially real time basis.

60. The computer program product according to claim 47, wherein said at least one graphical user interface includes a contrast indicator, said contrast indicator comprising a bar graph.

61. The computer program product according to claim 47, wherein said at least one graphical user interface includes an output event indicator, said output event indicator being activated upon occurrence of an output event.

62. The computer program product according to claim 47, wherein said at least one graphical user interface includes a dynamic range indicator, which is activated when said photoelectric sensor is operating near or out of the limit of the available dynamic range.

63. The computer program product according to claim 47, wherein said at least one graphical user interface includes a plurality of signal conditioning timer settings for controlling when said photoelectric sensor generates an output response, said computer programming said photoelectric sensor in accordance with a selected signal conditioning timer setting.

64. A computer program product for controlling a computer comprising a recording medium readable by the computer, instructions recorded on the recording medium for programming a photoelectric sensor and for monitoring the performance of the photoelectric sensor by performing the steps of:

generating at least one graphical user interface utilized for programming the operation of said photoelectric sensor, said at least one graphical user interface generated by an external processor, said external processor coupled to said photoelectric sensor via a data port provided on said photoelectric sensor; and displaying said at least one graphical user interface on an external display device;

said external processor controlling said photoelectric sensor in accordance with a selection of an operator utilizing said at least one graphical user interface, wherein said at least one graphical user interface provides a plot of the level of a signal received by said photoelectric sensor contrasted against the dynamic range of the photoelectric sensor versus time.

65. The computer program product according to claim 64, wherein said at least one graphical user interface provides said plot on a substantially real time basis.

66. The computer program product according to claim 65, wherein said external display device further includes a first line and a second line defining a portion of the dynamic range of the photoelectric sensor, said photoelectric sensor having a first trip point defined relative to the position of said first line, and said photoelectric sensor having a second trip point defined relative to the position of said second line.

67. The computer program product according to claim 66, wherein said first line and said second line are movable by selecting a bar control area on said at least one graphical user interface, said first line and said second line moving in unison with one another, said first trip point and said second trip point of said photoelectric sensor being adjusted in accordance with the new position of said first line and said second line.

68. A computer program product for controlling a computer comprising a recording medium readable by the computer, instructions recorded on the recording medium for programming a photoelectric sensor and for monitoring the performance of the photoelectric sensor by performing the steps of:

generating at least one graphical user interface utilized for programming the operation of said photoelectric sensor, said at least one graphical user interface generated by an external processor, said external processor coupled to said photoelectric sensor via a data port provided on said photoelectric sensor; and displaying said at least one graphical user interface on an external display device;

said external processor controlling said photoelectric sensor in accordance with a selection of an operator utilizing said at least one graphical user interface, wherein once said photoelectric sensor is programmed by said computer in accordance with selections made by an operator utilizing said at least one graphical user interface, said photoelectric sensor remains operational when disconnected from said external processor and said external display device.

69. The computer program product according to claim 68, wherein said external processor communicates with said photoelectric sensor utilizing a serial interface.

70. A programmable photoelectric sensor, said programmable photoelectric sensor comprising:

a data input port for receiving serial configuration data from an external processor;

an internal processor coupled to said data input port for receiving said serial configuration data regarding a predetermined mode of operation, said internal processor controlling said programmable photoelectric sensor such that said programmable photoelectric sensor operates in said predetermined mode of operation; and a memory device coupled to said internal processor, said internal processor operative for storing a plurality of operational settings in said memory device upon receiving an instruction to store settings from said external processor, said plurality of operational settings defining the operation of said programmable photoelectric sensor in said predetermined mode of operation, wherein said programmable photoelectric sensor remains operational when disconnected from said external processor.

71. A programmable photoelectric sensor according to claim 70, wherein said operational settings of said programmable photoelectric sensor includes a serial number of said programmable photoelectric sensor.

72. A programmable photoelectric sensor according to claim 70, wherein said programmable photoelectric sensor includes a contrast indicator comprising a bar graph.

73. A programmable photoelectric sensor according to claim 70, wherein said data input port receives serial data utilizing a serial interface.

* * * * *